US011799142B2

(12) United States Patent
Zhou et al.

(10) Patent No.: US 11,799,142 B2
(45) Date of Patent: Oct. 24, 2023

(54) BATTERY MODULE, DEVICE, AND FAILURE HANDLING METHOD FOR FAILED BATTERY CELL

(71) Applicant: CONTEMPORARY AMPEREX TECHNOLOGY CO., LIMITED, Ningde (CN)

(72) Inventors: Di Zhou, Fujian (CN); Ye Xu, Fujian (CN); Bin Zhao, Fujian (CN); Rongcai Chen, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 86 days.

(21) Appl. No.: 17/564,953

(22) Filed: Dec. 29, 2021

(65) Prior Publication Data

US 2022/0123380 A1 Apr. 21, 2022

Related U.S. Application Data

(63) Continuation of application No. PCT/CN2020/130735, filed on Nov. 23, 2020.

(30) Foreign Application Priority Data

Nov. 29, 2019 (CN) .......................... 201911205556.3

(51) Int. Cl.
*H01M 10/48* (2006.01)
*H01M 50/209* (2021.01)
(Continued)

(52) U.S. Cl.
CPC ....... *H01M 10/482* (2013.01); *H01M 50/103* (2021.01); *H01M 50/147* (2021.01);
(Continued)

(58) Field of Classification Search
CPC ............ H01M 10/482; H01M 50/103; H01M 50/147; H01M 50/209; H01M 50/533;
(Continued)

(56) References Cited

U.S. PATENT DOCUMENTS

| 8,852,770 B2 | 10/2014 | Langheim |
| 9,123,978 B2 | 9/2015 | Langheim |

(Continued)

FOREIGN PATENT DOCUMENTS

| CN | 202395111 U | 8/2012 |
| CN | 103996816 A | 8/2014 |

(Continued)

OTHER PUBLICATIONS

Extended European Search Report dated May 10, 2022 received in European Patent Application No. EP 20892860.6.

(Continued)

*Primary Examiner* — M Baye Diao
(74) *Attorney, Agent, or Firm* — Scully, Scott, Murphy & Presser, P.C.

(57) ABSTRACT

This application relates to a battery module, a device, and a failure handling method for a failed battery cell. The battery module includes: battery cells, where each battery cell includes a housing, a top cover, and an electrode assembly, the housing is connected to the top cover, the housing includes a first accommodation cavity, the electrode assembly is located inside the first accommodation cavity, the top cover is provided with a positive electrode terminal and a negative electrode terminal, and the battery cells further include a failed battery cell; and a conductive component, connected to the positive electrode terminal and the negative electrode terminal of the failed battery cell. After being connected to the electrode terminals, the conductive com- (Continued)

ponent does not occupy space outside the failed battery cell, improving safety of the battery module.

18 Claims, 7 Drawing Sheets

(51) Int. Cl.
*H01M 50/533* (2021.01)
*H01M 50/543* (2021.01)
*H01M 50/103* (2021.01)
*H01M 50/147* (2021.01)

(52) U.S. Cl.
CPC ....... *H01M 50/209* (2021.01); *H01M 50/533* (2021.01); *H01M 50/543* (2021.01); *H01M 2200/00* (2013.01); *H01M 2220/20* (2013.01)

(58) Field of Classification Search
CPC .......... H01M 50/543; H01M 2200/00; H01M 2220/20; H01M 10/4207; H01M 50/249; H01M 10/42; H01M 50/574; Y02E 60/10; B60L 3/0046; B60Y 2200/91
USPC ........................................................ 320/134
See application file for complete search history.

(56) References Cited

U.S. PATENT DOCUMENTS

| 10,249,867 | B2 * | 4/2019 | Kitaoka | H01M 50/538 |
| 11,588,186 | B2 * | 2/2023 | Wang | H01M 50/55 |
| 2012/0315518 | A1 | 12/2012 | Langheim | |
| 2013/0200856 | A1 * | 8/2013 | Zhang | B60L 58/18 320/150 |
| 2014/0227567 | A1 * | 8/2014 | Han | H01M 10/0413 429/61 |
| 2014/0335383 | A1 | 11/2014 | Langheim | |
| 2021/0143518 | A1 * | 5/2021 | Zhou | H01M 50/209 |

FOREIGN PATENT DOCUMENTS

| CN | 109728346 A | 5/2019 | | |
| CN | 110010833 A | 7/2019 | | |
| CN | 209199991 U | 8/2019 | | |
| CN | 209447876 U | 9/2019 | | |
| JP | 2010049870 A | 3/2010 | | |
| JP | 2016091827 A | 5/2016 | | |
| JP | 2018037184 A * | 3/2018 | ............. | Y02E 60/10 |
| KR | 101382297 B1 | 4/2014 | | |
| KR | 20140102587 A | 8/2014 | | |
| KR | 20150112494 A * | 10/2015 | .......... | H01M 50/581 |
| KR | 20160091124 A | 8/2016 | | |
| WO | WO-2012124238 A1 * | 9/2012 | ............. | H01M 10/42 |

OTHER PUBLICATIONS

International Search Report dated Feb. 24, 2021 issued in PCT/CN2020/130735.

Notice of Allowance dated Jun. 13, 2023 received in Korean Patent Application No. KR 10-2022-7020006.

* cited by examiner

BATTERY MODULE, DEVICE, AND FAILURE HANDLING METHOD FOR FAILED BATTERY CELL

CROSS-REFERENCE TO RELATED APPLICATIONS

This application is a continuation of International Application No. PCT/CN2020/130735, filed on Nov. 23, 2020, which claims priority to Chinese Patent Application No. CN201911205556.3, filed on Nov. 29, 2019. The disclosures of the aforementioned applications are hereby incorporated by reference in their entireties.

TECHNICAL FIELD

This application relates to the technical field of energy storage devices, and in particular, to a battery module, a device, and a failure handling method for a failed battery cell.

BACKGROUND

A battery module includes a plurality of battery cells that are stacked, and the plurality of battery cells are electrically connected, to output electric energy of the battery module for supplying power to electrical appliances. There is a risk of failure when the battery cells are charged and discharged. The failure of one battery cell may cause the entire circuit of the battery module to fail, making the battery module unable to function properly. Currently, when a battery cell fails, usually the entire battery module is replaced. However, when one battery cell of the battery module fails, its other battery cells can still function properly, so the method of directly replacing the entire battery module causes a waste of resources. In addition, it takes a long time to remove and install the battery module, which reduces work efficiency.

SUMMARY

This application provides a battery module, a device, and a failure handling method for a failed battery cell, which can simplify a maintenance process of the battery module, reduce maintenance costs, and increase work efficiency of the battery module.

According to a first aspect, an embodiment of this application provides a battery module, where the battery module includes:

battery cells, where each battery cell includes a housing, a top cover, and an electrode assembly, the housing is connected to the top cover, the housing includes a first accommodation cavity, the electrode assembly is located inside the first accommodation cavity, the top cover is provided with a positive electrode terminal and a negative electrode terminal, the positive electrode terminal and the negative electrode terminal are arranged along a length direction of the battery module, and face toward a width direction of the battery module, and the battery cells further include a failed battery cell; and a conductive component, where the conductive component is connected to a positive electrode terminal and a negative electrode terminal of the failed battery cell;

where along a height direction of the battery module, the housing includes a first cover plate and a second cover plate that are arranged opposite each other, both the first cover plate and the second cover plate are connected to the top cover, the first cover plate and/or the second cover plate is provided with an opening, the conductive component extends into the first accommodation cavity through the opening and is located in the first accommodation cavity. In this embodiment, it is only required to connect the positive and negative electrode terminals of the failed battery cell through the conductive component, instead of replacing the entire battery module, which simplifies a maintenance process of the battery module, reduces maintenance costs, and increases work efficiency of the battery module.

In some embodiments, the electrode assembly includes tabs that include a positive tab and a negative tab, and the battery cell includes adapting pieces that include a positive electrode adapting piece and a negative electrode adapting piece.

The positive electrode adapting piece is connected to the positive tab and the positive electrode terminal, and the negative electrode adapting piece is connected to the negative tab and the negative electrode terminal.

In the failed battery cell, one end of the conductive component is connected to the positive tab and/or the positive electrode adapting piece, and the other end is connected to the negative tab and/or the negative electrode adapting piece. In the embodiments, it is easier to connect the conductive component to the tabs and/or the adapting pieces. Compared with the electrode terminals, the tabs and the adapting pieces have larger areas, so that when the tabs or the adapting pieces are connected to the conductive component, a contact area between the conductive component and an tab or an adapting piece can be larger, and a current flowing area between the two can be increased.

In some embodiments, the conductive component includes a first conductive part and a second conductive part, and the first conductive part is connected to the second conductive part.

The first conductive part is connected to the positive tab, and the second conductive part is connected to the negative tab.

The first conductive part and the positive tab are structures of a same material, and the second conductive part and the negative tab are structures of a same material. In the embodiments, in welding the first conductive part to the positive tab, and the second conductive part to the negative tab, connection reliability at a welding location may be improved to facilitate welding operations.

In some embodiments, along a height direction, the second cover plate is located under the first cover plate, and the opening is provided in the first cover plate.

The opening extends along a length direction, and along the height direction, and at least part of the tabs and/or the adapting pieces is exposed through the opening, thereby enabling the conductive component to connect to the tabs and/or the adapting pieces.

In some embodiments, the first accommodation cavity is filled with a structural adhesive. In the embodiments, the structural adhesive may be used to increase connection strength between the conductive component and the adapting pieces and/or the tabs, while preventing an air-dried and fallen electrode plate from leaving the first accommodation cavity, improving safety of the battery module.

In some embodiments, the electrode assembly of the failed battery cell can be removed through the opening. In the embodiments, the failed battery cell is incapable of generating electric energy, so that a risk of burning and explosion occurring when the failed battery cell continues to generate electric energy can be avoided, improving safety of the battery module. Moreover, the weight of the battery module can be reduced, and energy density can be increased.

In some embodiments, the failed battery cell further includes a positive electrode adapting piece and a negative electrode adapting piece.

The positive electrode adapting piece is connected to the positive electrode terminal, the negative electrode adapting piece is connected to the negative electrode terminal, and in the failed battery cell, the conductive component is connected to the positive electrode adapting piece and the negative electrode adapting piece.

The conductive component includes a first conductive part and a second conductive part, where the first conductive part is connected to the second conductive part, the first conductive part is connected to the positive electrode adapting piece, and the second conductive part is connected to the negative electrode adapting piece.

The first conductive part and the positive electrode adapting piece are structures of a same material, and the second conductive part and the negative electrode adapting piece are structures of a same material. In the embodiments, in welding the first conductive part to the positive electrode adapting piece, and the second conductive part to the negative electrode adapting piece, connection reliability at a welding location may be improved to facilitate welding operations.

In some embodiments, the failed battery cell further includes a supporting component, and the supporting component is located inside the first accommodation cavity.

Along a length direction, the supporting component abuts against an inner wall of the housing. In the embodiments, structural strength of the failed battery cell along the length direction is increased, avoiding a risk of deformation and damage to the failed battery cell.

In some embodiments, a plurality of battery cells are arranged along a length direction to form a battery cell arrangement structure, and along a height direction, the battery module includes at least two layers of battery cell arrangement structures.

Along the height direction, a battery cell located over the failed battery cell is a target battery cell, and the battery module includes one or more target battery cells.

In the target battery cell, the first cover plate and the second cover plate each are provided with an opening, the electrode assembly of the target battery cell is removed through the opening of the first cover plate, and the positive electrode terminal and the negative electrode terminal of the target battery cell are connected by using the conductive component, or the positive electrode adapting piece and the negative electrode adapting piece of the target battery cell are connected by using the conductive component.

In the target battery cell, the second cover plate is located under the first cover plate, the first cover plate is provided with an opening, the electrode assembly of the failed battery cell is removed through the opening, and the positive electrode terminal and the negative electrode terminal of the failed battery cell are connected by using the conductive component, or the positive electrode adapting piece and the negative electrode adapting piece of the failed battery cell are connected by using the conductive component. In the embodiments, even when the failed battery cell is located in an intermediate layer, the failed battery cell still allows the electrode assembly of the failed battery cell to be removed. Moreover, none of the battery cell(s) over the failed battery cell can generate electric energy, while the battery cell(s) under the failed battery cell can still generate electric energy.

According to a second aspect, an embodiment of this application provides a device using a battery cell as a power supply. The device includes:

a power source, the power source being configured to provide driving force for the device; and the battery module described above, configured to supply electric energy to the power source. In this embodiment, when one battery cell or some battery cells fail during operation of the battery module, it is not required to repair or replace the entire battery module, thereby increasing work efficiency of the battery module, simplifying a maintenance process, and reducing maintenance costs.

According to a third aspect, an embodiment of this application provides a failure handling method for a failed battery cell, where the failed battery cell includes a housing, a positive electrode terminal, and a negative electrode terminal, the failed battery cell includes a first accommodation cavity, and along a height direction, the housing includes a first cover plate and a second cover plate that are arranged opposite each other.

The failure handling method includes:

providing an opening in the first cover plate and/or the second cover plate; and placing a conductive component into the first accommodation cavity through the opening and connecting the positive electrode terminal and the negative electrode terminal by using the conductive component. In this embodiment, the positive electrode terminal and the negative electrode terminal of the failed battery cell can be connected inside the housing, so that when being connected to the electrode terminals, the conductive component does not occupy space outside the failed battery cell, thereby preventing the conductive component from connecting to another conductive component of the battery module, and improving safety and reliability of the battery module.

In some embodiments, the failed battery cell includes a positive electrode adapting piece, a negative electrode adapting piece, and an electrode assembly, where the electrode assembly includes a positive tab and a negative tab, the positive electrode adapting piece is connected to the positive tab and the positive electrode terminal, and the negative electrode adapting piece is connected to the negative tab and the negative electrode terminal.

When the positive electrode terminal and the negative electrode terminal are to be connected by using the conductive component, the failure handling method includes:

connecting one end of the conductive component to the positive tab and/or the positive electrode adapting piece, and connecting the other end of the conductive component to the negative tab and/or the negative electrode adapting piece. In the embodiments, when the conductive component is connected to the positive electrode terminal and the negative electrode terminal inside the first accommodation cavity, it is easier to connect the conductive component to the tabs and/or the adapting pieces indirectly.

In some embodiments, after the positive electrode terminal and the negative electrode terminal are connected by using the conductive component, the failure handling method further includes:

injecting a structural adhesive into the first accommodation cavity through the opening. In the embodiments, the structural adhesive is injected into the first accommodation cavity, which not only strengthens the locations for connecting (directly or indirectly connecting) the conductive component to the electrode terminals, but also blocks the opening by the structural adhesive, to prevent the air-dried and fallen electrode plate from leaving the first accommodation cavity through the opening, improving safety of the battery module.

In some embodiments, before the placing a conductive component into the first accommodation cavity through the opening and connecting the positive electrode terminal and the negative electrode terminal by using the conductive component, the failure handling method further includes:

extracting an electrolyte from the first accommodation cavity through the opening.

In some embodiments, before the placing a conductive component into the first accommodation cavity through the opening and connecting the positive electrode terminal and the negative electrode terminal by using the conductive component, the failure handling method further includes:

extracting an electrolyte from the first accommodation cavity through the opening, and removing the electrode assembly of the failed battery cell through the opening. In the embodiments, not only the space for connecting the conductive component to the electrode terminals inside the first accommodation cavity can be increased, but also the electrode plate of an electrode unit can be prevented from being air-dried and falling off due to extraction of the electrolyte, thereby improving safety of the battery module.

In some embodiments, the failed battery cell includes a positive electrode adapting piece and a negative electrode adapting piece, where the positive electrode adapting piece is connected to the positive electrode terminal, and the negative electrode adapting piece is connected to the negative electrode terminal.

When the positive electrode terminal and the negative electrode terminal are to be connected by using the conductive component, the failure handling method includes:

connecting the conductive component to the positive electrode adapting piece, and the conductive component to the negative electrode adapting piece. In the embodiments, after the electrode assembly is removed out of the first accommodation cavity, the tabs are removed together with the electrode assembly, so that the conductive component can be indirectly connected to the electrode terminals through the adapting pieces. Moreover, a contact area between an adapting piece and the conductive component meets a current flowing requirement of the battery module.

In some embodiments, after the removing out the electrode assembly of the failed battery cell through the opening, the failure handling method further includes:

placing a supporting component into the first accommodation cavity through the opening to make the supporting component abut against an inner wall of the housing along a length direction. In the embodiments, the supporting component is placed into the first accommodation cavity, increasing strength and rigidity of the housing along the length direction and reducing a risk of deformation and damage to the failed battery cell.

In the embodiments of this application, the positive electrode terminal and the negative electrode terminal of the failed battery cell are connected, to short-circuit the failed battery cell, so that the failed battery cell no longer participates in a charging and discharging process of the battery module, which means that the failed battery cell has no impact on the circuit of the battery module. Therefore, when one battery cell or some battery cells fail during a working process of the battery module, it is not required to repair or replace the entire battery module. When such a battery module is used in a vehicle, the vehicle can be repaired directly in a 4S shop without the need to return the vehicle to the factory for processing or replace the battery module, thereby increasing work efficiency of the battery module, simplifying a maintenance process, and reducing maintenance costs. Moreover, after the foregoing handling, only a few battery cells (failed battery cells) in the battery module do not participate in the formation of the circuit, so that the battery capacity of the battery module does not decrease sharply and the battery module can still work normally.

Moreover, the positive electrode terminal and the negative electrode terminal of the failed battery cell are connected inside the housing, so that when being connected to the electrode terminals, the conductive component does not occupy space outside the failed battery cell, preventing the conductive component from connecting to another conductive component of the battery module, and improving safety and reliability of the battery module.

It should be understood that the foregoing general description and the following detailed description are only exemplary and are not intended to limit this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
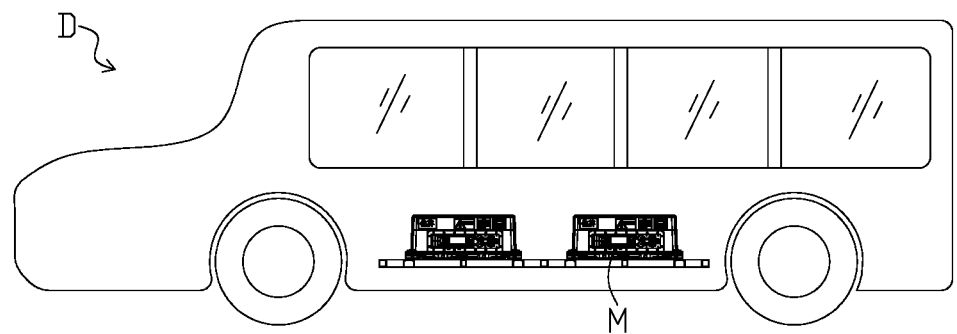
FIG. 1 is a schematic structural diagram of a device according to a specific embodiment of this application.

The accompanying drawings herein are incorporated into this specification and form a part of this specification and illustrate the embodiments conforming to this application. These drawings are intended to explain the principles of this application together with the specification.

DESCRIPTION OF EMBODIMENTS

To help better understand the technical solutions of this application, the following describes the embodiments of this application with reference to accompanying drawings.

Apparently, the described embodiments are merely some but not all of the embodiments of this application. All other embodiments obtained by a person of ordinary skill in the art based on the embodiments of this application without creative efforts shall fall within the protection scope of this application.

The terms used in the embodiments of this application are merely for the purpose of illustrating specific embodiments, and are not intended to limit this application. The terms "a/an", "the" and "this" of singular forms used in the embodiments and the appended claims of this application are also intended to include plural forms, unless otherwise specified in the context clearly.

It should be understood that in this specification, the term "and/or" is only an associative relationship for describing associated objects, indicating that three relationships may exist. For example, A and/or B may indicate three situations: A exists independently; A and B exist simultaneously; and B exists independently. In addition, the character "/" in this specification generally indicates an "or" relationship between contextually associated objects.

It should be noted that the directional terms such as "up", "down", "left", and "right" described in the embodiments of this application are described as seen from the angles shown in the accompanying drawings, and should not be understood as a limitation to the embodiments of this application. In addition, in the context, it should be further understood that when an element is referred to as being "above" or "under" another element, the element can not only be directly connected "above" or "under" the another element, but also be indirectly connected "above" or "under" the another element through an intermediate element.

An embodiment of this application provides a device D using a battery cell 1 as a power supply, and a battery module M. The device D using the battery cell 1 as a power supply includes a vehicle, a ship, a small aircraft, and other mobile devices. The device D includes a power source, and the power source is configured to provide driving force for the device D, and the power source may be configured as the battery module M supplying electric energy to the device D. The driving force for the device D may be only electric energy, or may include electric energy and other energy (such as mechanical energy). The power source may be the battery module M, or may be the battery module M and an engine. Therefore, any device D that can use the battery cell 1 as a power supply falls within the protection scope of this application.

As shown in FIG. 1, taking a vehicle as an example, the device D in this embodiment of this application may be a new energy vehicle, which may be a battery electric vehicle, or may be a hybrid electric vehicle or an extended-range electric vehicle. The vehicle may include a battery module M and a vehicle body. The battery module M is disposed in the vehicle body. The vehicle body is also provided with a drive motor, and the drive motor is electrically connected to the battery module M. The battery module M provides electric energy to the drive motor. The drive motor is connected to wheels on the vehicle body through a transmission mechanism to drive travel of the vehicle. Specifically, the battery module M may be horizontally disposed at the bottom of the vehicle body.

More specifically, the battery module M includes a plurality of battery cells 1 and a box body 3 for fixing the battery cells 1, where the box body 3 may include end plates 32, and the end plates 32 are located at two ends of the battery module M along a length direction X for restricting movement of the battery cells 1 along the length direction X. In a specific embodiment, the box body 3 may further include side plates 33, and the two side plates 33 are located at two sides of the battery module M along a width direction Y for restricting movement of the battery cells 1 along the width direction Y. The box body 3 may further include a box cover 31 which is located at an end of the battery module M along a height direction Z for restricting movement of the battery cells 1 along the height direction Z. The side plates 33, the end plates 32, and the box cover 31 are connected to form the box body 3, and enclose into a second accommodation cavity 34 inside which the battery cells 1 are located.

Figure 4:
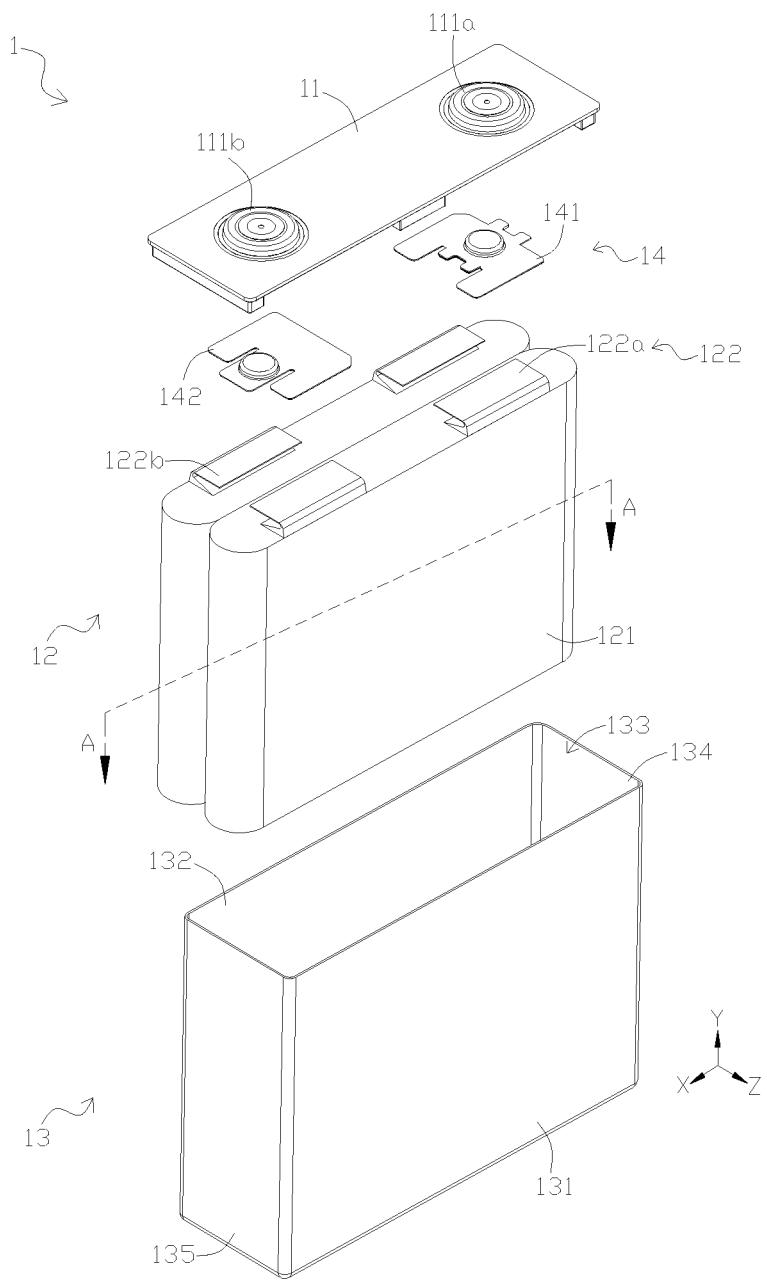
FIG. 4 is an exploded view of a battery cell shown in FIG. 3.

Specifically, as shown in FIG. 4, the battery cell 1 includes a top cover 11, an electrode assembly 12, and a housing 13. The top cover 11 and the housing 13 are connected and enclose into a first accommodation cavity 133. The first accommodation cavity 133 is used to accommodate the electrode assembly 12 and an electrolyte. Inside the first accommodation cavity 133, there may be a plurality of electrode assemblies 12, and the plurality of electrode assemblies 12 are stacked on top of each other. In the embodiment shown in FIG. 4, the housing 13 accommodates two electrode assemblies 12. The housing 13 may be of a hexahedron shape or another shape, and the housing 13 may include a metal material, such as aluminum or aluminum alloy, or may include an insulation material, such as plastic. The battery cell 1 further includes electrode terminals 111, and the electrode terminals 111 include a positive electrode 111a and a negative electrode 111b, both of which are disposed on the top cover 11.

Figure 5:
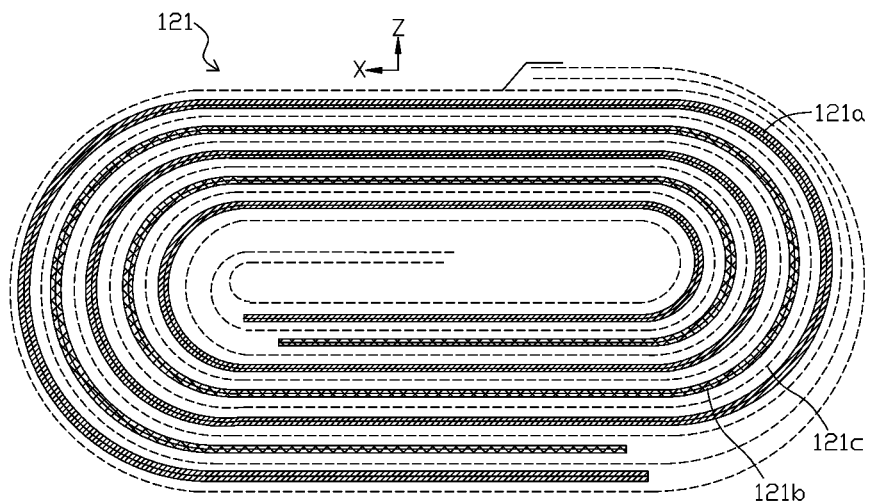
FIG. 5 is an A-A section view of FIG. 4.

The electrode assembly 12 includes an electrode unit 121 and tabs 122. As shown in FIG. 5, the electrode unit 121 includes a positive electrode plate 121a, a negative electrode plate 121b, and a separator 121c which are stacked on top of each other, and the separator 121c is located between the positive electrode plate 121a and the negative electrode plate 121b for separating the two electrode plates. The three are stacked and then wound. After the electrode unit 121 is formed, there is a gap. The electrolyte can enter the electrode unit 121 through the gap to wet the positive electrode plate 121a and the negative electrode plate 121b, so as to generate electric energy.

Moreover, two tabs 122, which are a positive tab 122a and a negative tab 122b, extend from the top of the electrode unit 121, which means that the electrode assembly 12 shown in FIG. 4 is a structure with the tabs 122 extending from the top. In another specific embodiment, the electrode assembly 12 may be a structure with the tabs 122 extending from sides, and in this case, the two tabs 122 extend from two sides of the electrode unit 121, respectively.

As shown in FIG. 4, the battery cell 1 may further include adapting pieces 14, and specifically, a positive electrode adapting piece 141 and a negative electrode adapting piece 142. The positive electrode adapting piece 141 is configured to connect the positive electrode terminal 111a and the positive tab 122a, and the negative electrode adapting piece 142 is configured to connect the negative electrode terminal 111b and the negative tab 122b, so that electric energy generated by the electrode unit 121 can be delivered to the electrode terminals 111 and output.

In another specific embodiment, the electrode assembly 12 is a structure with the tabs 122 extending from the sides. In this case, the adapting piece 14 is a bent structure for connecting an electrode terminal 111 on the top and an tab 122 at a side.

Figure 2:
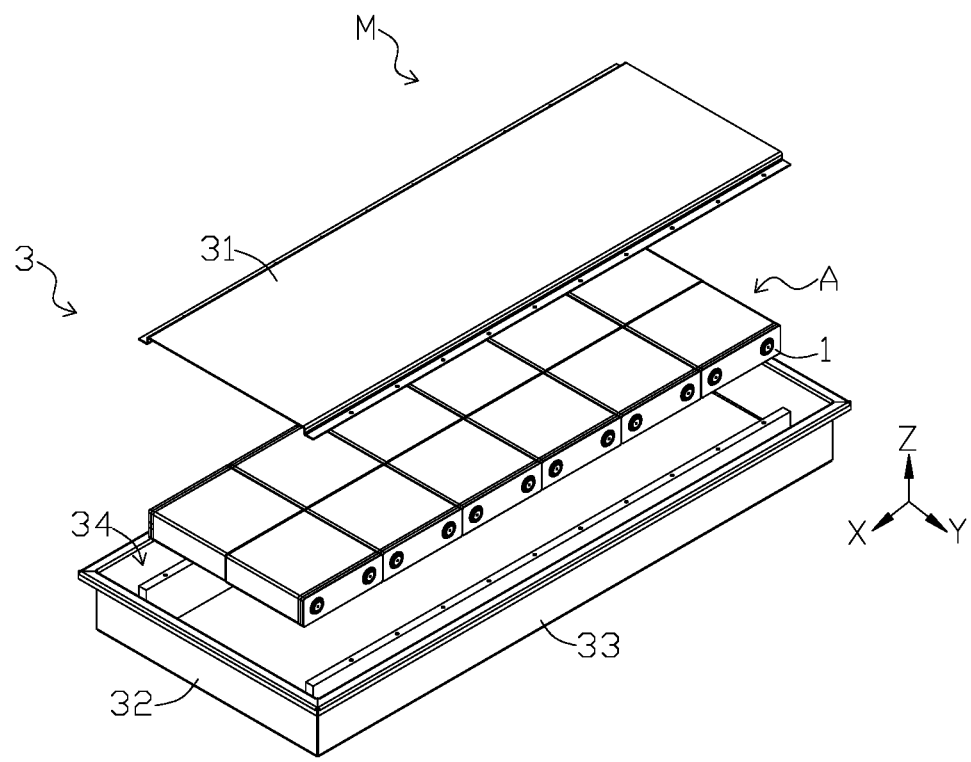
FIG. 2 is an exploded view of the battery module shown in FIG. 1 according to a specific embodiment.
Figure 3:
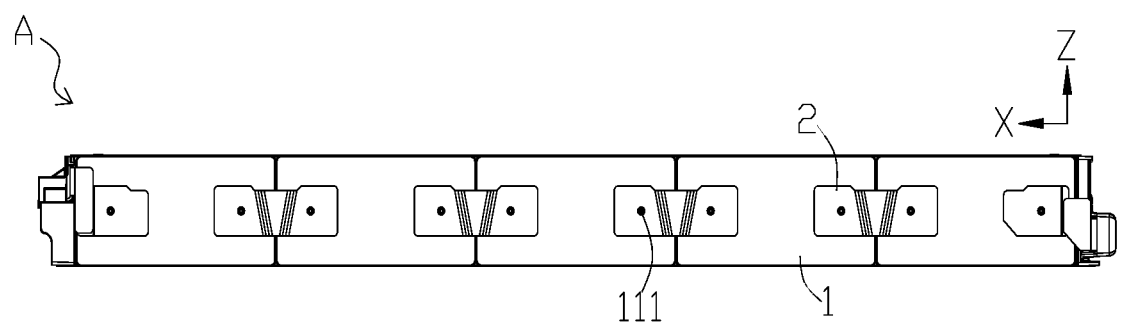
FIG. 3 is a front view of a battery cell arrangement structure shown in FIG. 2.

In the embodiments shown in FIG. 2 and FIG. 3, the electrode terminals 111 of the battery cell 1 are arranged along the length direction X of the battery module M, and face toward the width direction Y of the battery module, that is, the electrode terminals 111 face toward a side plate 33. As shown in FIG. 4, in the battery cell 1, along the height direction Z, the housing 13 includes a first cover plate 131 and a second cover plate 132 that are arranged opposite each other. The first cover plate 131 and the second cover plate 132 each have a surface with a largest area in the housing 13. Moreover, along the length direction X, the housing 13 further includes a third cover plate 134 and a fourth cover plate 135 that are arranged opposite each other, and the third cover plate 134 and the fourth cover plate 135 each are smaller than the first cover plate 131 and the second cover plate 132 in area. The first cover plate 131, the second cover plate 132, the third cover plate 134, and the fourth cover plate 135 are all connected to the top cover 11.

In the battery module M, a plurality of battery cells 1 are electrically connected to form a circuit of the battery module M, the battery cells 1 can be connected in series and/or in parallel, and the battery cells 1 are connected by using the adapting pieces 2. For example, when the battery cells 1 are connected in series, the positive electrode terminal 111a of one battery cell 1 and the negative electrode terminal 111b of another battery cell 1 are connected by using the adapting piece 2.

During the operation of the battery module M, each battery cell 1 is continuously charged and discharged, and during the charging and discharging process, the battery cells 1 are at a risk of failure (such as thermal runaway), causing a failed battery cell 15 unable to work normally. In this case, the circuit of the battery module M is faulty and cannot supply power normally. In this application, this technical problem is resolved by removing out the failed battery cell 15 from the circuit and forming a new circuit.

Figure 8:
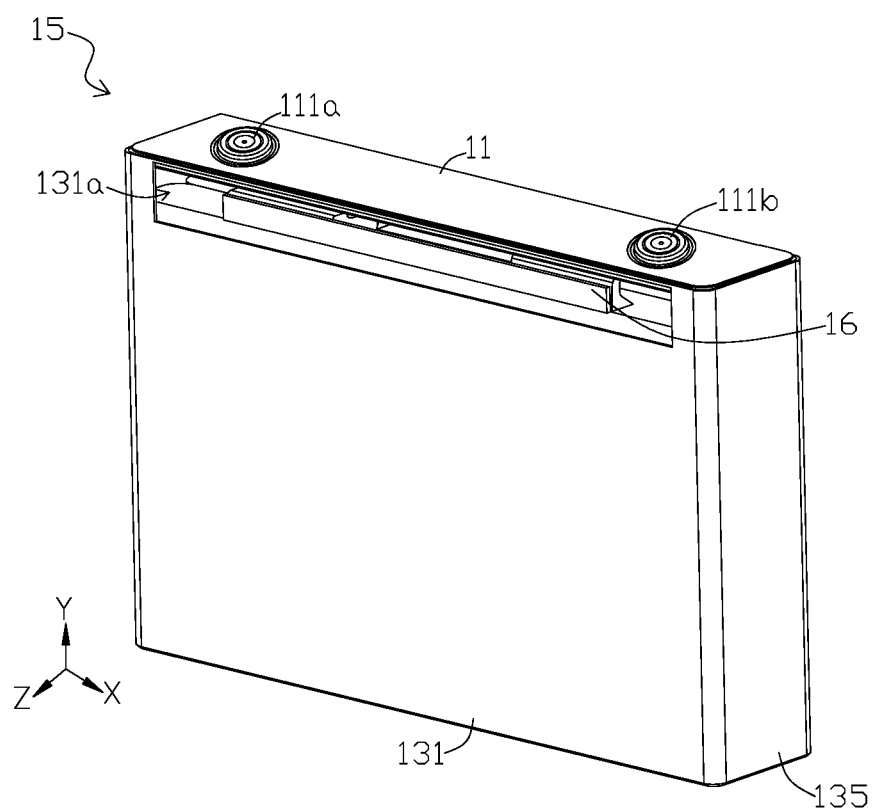
FIG. 8 is a schematic structural diagram of the failed battery cell shown in FIG. 6, with a conductive component provided.

Specifically, as shown in FIG. 8, the battery module M further includes a conductive component 16, where the conductive component 16 is connected to the positive electrode terminal 111a and the negative electrode terminal 111b of the failed battery cell 15, to short-circuit the failed battery cell 15. The positive electrode terminal 111a and the negative electrode terminal 111b of the failed battery cell 15 may be directly connected by using the conductive component 16, or the conductive component 16 may be electrically connected to other conductive structures (such as the tabs 122 and/or the adapting pieces 14), to electrically connect the positive electrode terminal 111a and the negative electrode terminal 111b in an indirect way.

In addition, the battery cell 1 involved in an embodiment of this application may be a soft package battery, or may be a square battery or a cylindrical battery. Accordingly, the electrode terminals 111 of the battery cell 1 (including the positive electrode terminal 111a and the negative electrode terminal 111b) may be electrode terminals of the soft package battery, or may be electrode terminals of the square battery or the cylindrical battery.

In this embodiment, the positive electrode terminal 111a and the negative electrode terminal 111b of the failed battery cell 15 are connected, to short-circuit the failed battery cell 15, so that the failed battery cell 15 no longer participates in a charging and discharging process of the battery module M, which means that the failed battery cell 15 has no impact on the circuit of the battery module M. Therefore, when one battery cell 1 or some battery cells 1 fail during a working process of the battery module M, it is only required to connect the positive and negative electrode terminals of the failed battery cell 15 by using the conductive component 16, instead of replacing the entire battery module M. When such a battery module M is used in a vehicle, the vehicle can be repaired directly in a 4S shop without the need to return the vehicle to the factory for processing or replace the battery module M with a new battery module, thereby increasing work efficiency of the battery module M, simplifying a maintenance process, and reducing maintenance costs. Moreover, after the foregoing handling, only a few battery cells (failed battery cells 15) in the battery module M do not participate in the formation of the circuit, so that the battery capacity of the battery module M does not decrease sharply and the battery module M can still work normally.

In addition, for a structure in which the battery cell 1 is attached to the second accommodation cavity 34 of the box body 3 through a structural adhesive, when a specific battery cell 1 fails, it is not easy to implement an operation of removing the failed battery cell 15 out of the second accommodation cavity 34. By contrast, in this embodiment, the handling method of connecting the positive and negative electrode terminals of the failed battery cell 15 by using the conductive component 16 has the advantages of easy operation and high efficiency.

Specifically, as shown in FIG. 8, in the failed battery cell 15, the first cover plate 131 and/or the second cover plate 132 of the housing 13 is provided with an opening 131a, that is, the opening 131a faces toward the height direction Z of the battery module M. The conductive component 16 can pass through the opening 131a and is located in the first accommodation cavity 133 to connect the positive and negative electrode terminals of the failed battery cell 15.

In this embodiment, the positive electrode terminal 111a and the negative electrode terminal 111b of the failed battery cell 15 are connected inside the housing 13, so that when being connected to the electrode terminals 111, the conductive component 16 does not occupy space outside the failed battery cell 15, thereby preventing the conductive component 16 from connecting to another conductive component of the battery module M, and improving safety and reliability of the battery module M. Moreover, with the opening 131a provided in the housing 13 of the failed battery cell 15, the weight of the battery module M can be reduced, helping to increase energy density of the battery module M.

It should be noted that in the battery cell 1 shown in FIG. 4, there is also an opening between the top cover 11 and the housing 13. The opening is toward the width direction Y, and after the housing 13 is connected to the top cover 11, the opening is blocked. The opening 131a described in the embodiments of this application is provided in the first side surface 131 and/or the second side surface 132 of the housing 13, and is toward the height direction Z. Therefore, it is different from the opening between the top cover 11 and the housing 13 shown in FIG. 4.

Moreover, in order to prevent the electrolyte inside the first accommodation cavity 133 from leaking, after the opening 131a is provided, the electrolyte in the first accommodation cavity 133 is extracted, so that the failed battery cell 15 includes no electrolyte, thereby preventing leakage of the electrolyte from affecting safety of the battery module M. Moreover, after the electrolyte is extracted, the positive tab 121a and the negative tab 121b in the electrode unit 121 of the failed battery cell 15 cannot be connected through the electrolyte, and no electric energy can be generated. This reduces a risk of burning and explosion when the failed battery cell 15 continues to work. In addition, the energy density of the battery M may also be increased after the electrolyte is extracted.

In a possible design, as shown in FIGS. 6 to 9, because the electrode terminals 111 of the failed battery cell 15 are connected to the tabs 122 by the adapting pieces 14, to connect the positive electrode terminal 111a and the negative electrode terminal 111b of the failed battery cell 15 by using the conductive component 16, specifically the following operations may be implemented: connecting one end of the conductive component 16 to the positive tab 122a and/or the positive electrode adapting piece 141, and connecting the other end to the negative tab 122b and/or the negative electrode connecting tab 142, thereby indirectly connecting the positive electrode terminal 111a and the negative electrode terminal 111b of the failed battery cell 15 by using the conductive component 16.

Figure 6:
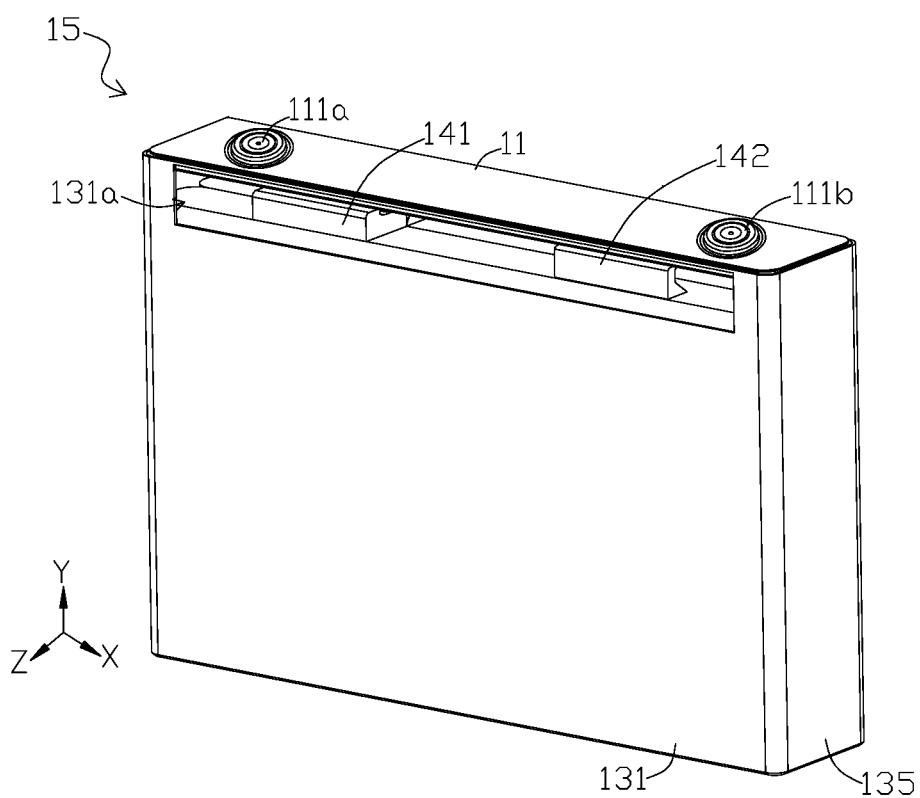
FIG. 6 is a schematic structural diagram of a failed battery cell with an opening provided according to a first specific embodiment of this application.
Figure 7:
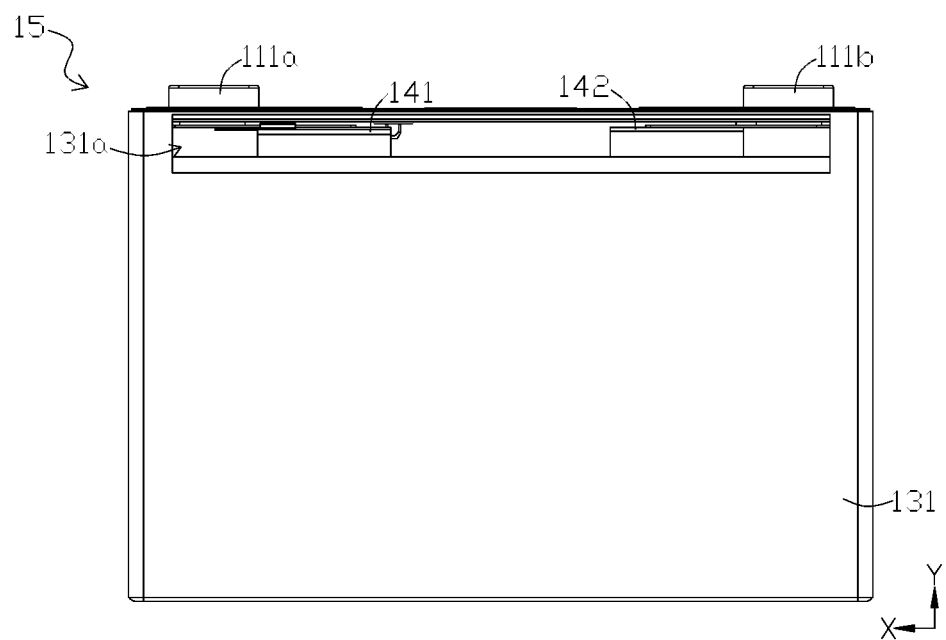
FIG. 7 is a front view of FIG. 6.

As shown in FIG. 6 and FIG. 7, in the failed battery cell 15, the tabs 122 and the adapting pieces 14 are all located inside the first accommodation cavity 133. Therefore, when the conductive component 16 is located inside the first accommodation cavity 133, the conductive component 16 can be connected to the tabs 122 and/or the adapting pieces 14 more easily. Compared with the electrode terminals 111, the tabs 122 and the adapting pieces 14 have larger areas, so that when the tabs 122 or the adapting pieces 14 are connected to the conductive component 16, a contact area between the conductive component 16 and an tab 122 or an adapting piece 14 can be larger, and a current flowing area between the two can be increased.

Figure 9:
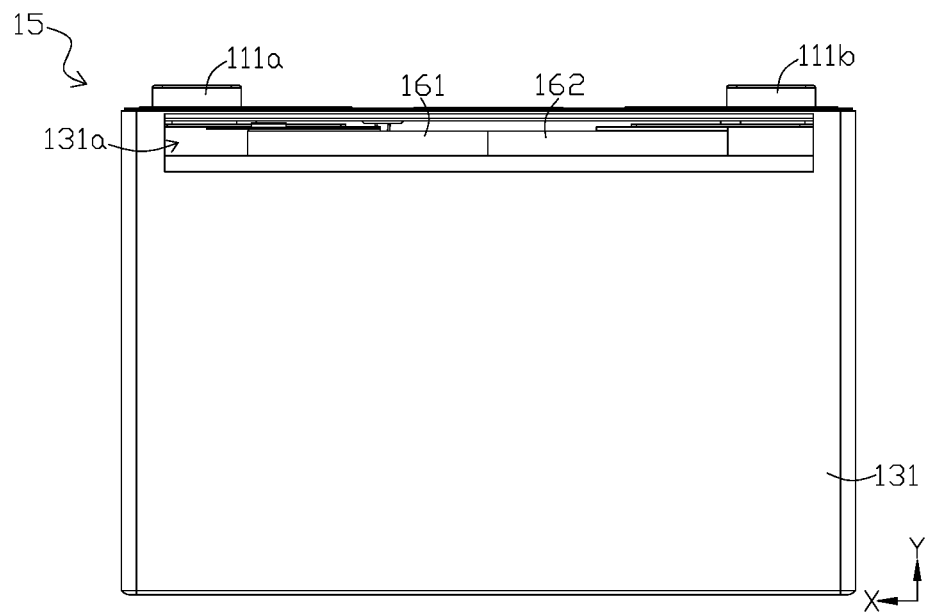
FIG. 9 is a front view of FIG. 8.

Specifically, as shown in FIG. 9, the conductive component 16 may include a first conductive part 161 and a second conductive part 162, where the first conductive part 161 is connected to the second conductive part 162, the first conductive part 161 and the positive tab 122a are structures of a same material, and the second conductive part 162 and the negative tab 122b are structures of a same material. The first conductive part 161 is welded to the positive tab 122a, and the second conductive part 162 is welded to the negative tab 122b.

In this embodiment, the conductive component 16 is connected to the two tabs 122 by welding. To improve connection reliability at a welding location, the two components to be welded together use the same material, which facilitates the welding operation, and also improves welding reliability.

Certainly, in this embodiment, the first conductive part 161 may alternatively be a structure having the same material as the positive electrode adapting piece 141, and the second conductive part 162 may be a structure having the same material as the negative electrode adapting piece 142. In this way, the first conductive part 161 can be welded to the positive electrode adapting piece 141, and the second conductive part 162 can be welded to the negative electrode adapting piece 142.

Alternatively, it may be that: the first conductive part 161 is to be connected to the positive tab 122a, and when the two are structures of a same material, they may be connected by welding; and the second conductive part 162 is to be connected to the negative electrode adapting piece 142, and when the two are structures of a same material, they may be connected by welding.

In another embodiment, the first conductive part 161 of the conductive component 16 may be connected to the positive tab 122a and/or the positive electrode adapting piece 141 by a conductive adhesive. Correspondingly, the second conductive part 162 may be connected to the negative tab 122b and/or the negative electrode adapting piece 142 by a conductive adhesive. In this case, it is not necessary to connect the components by welding. Therefore, the first conductive part 161 and the second conductive part 162 are not required to be structures of different materials, as long as the first conductive part 161 and the second conductive part 162 are conductive. This can simplify the structure of the conductive component 16 and reduce costs.

Specifically, as shown in FIG. 8 and FIG. 9, along the height direction Z, the second cover plate 132 is located under the first cover plate 131. The opening 131a may be provided in the first cover plate 131, and the opening 131a is provided close to the top cover 11, and corresponds to the tabs 122 and/or the adapting pieces 14. The opening 131a extends along the length direction X, and the size of the opening 131a needs to meet the following conditions: After the opening 131a is provided, the conductive component 16 can be placed into the first accommodation cavity 133 through the opening 131a, and moreover, along the height direction Z, at least part of the tabs 122 and/or the adapting pieces 14 is exposed through the opening 131a (the tabs 122 and/or the adapting pieces 14 do not extend out of the opening 131a), so that the conductive component 16 can be connected to the tabs 122 and/or the adapting pieces 14.

In a specific embodiment, when the conductive component 16 is configured to connect the positive electrode adapting piece 141 and the negative electrode adapting piece 142, the positive electrode adapting piece 141 and the negative electrode adapting piece 142 are arranged along the length direction X. Therefore, the length of the opening 131a needs to allow at least part of the two adapting pieces 14 to be exposed (the adapting pieces 14 do not extend out of the opening 131a), and also allows the conductive component 16 to pass through the opening 131a and enter the first accommodation cavity 133.

In the foregoing embodiments, the size of the conductive component 16 changes with the size of the battery cell 1. Correspondingly, the shape and size of the opening 131a also change with the size of the battery cell 1 as long as the foregoing conditions can be met. Therefore, the size and shape of the opening 131a are not limited in this application.

In a possible design, the first accommodation cavity 133 is also filled with a structural adhesive, and the structural adhesive is injected into the first accommodation cavity 133 through the opening 131a. The structural adhesive can be used to increase connection strength between the conductive component 16 and the adapting pieces 14 and/or the tabs 122. In addition, because the electrolyte of the failed battery cell 15 is extracted through the opening 131a, the electrode unit 121 is not infiltrated in the electrolyte. In this case, there is a risk that the positive electrode plate 121a and the negative electrode plate 121b of the electrode unit 121 may be air-dried and fall off and leave the first accommodation cavity 133 through the opening 131a. The electrode plates are conductive, and therefore, it is possible that the fallen electrode plate conducts electricity between the battery cell 1 and the adapting piece 2 in the battery module M. In this embodiment, after being filled with the structural adhesive, the opening 131a may be blocked by the structural adhesive, preventing the air-dried and fallen electrode plate from leaving the first accommodation cavity 133, and improving safety of the battery module M.

Figure 10:
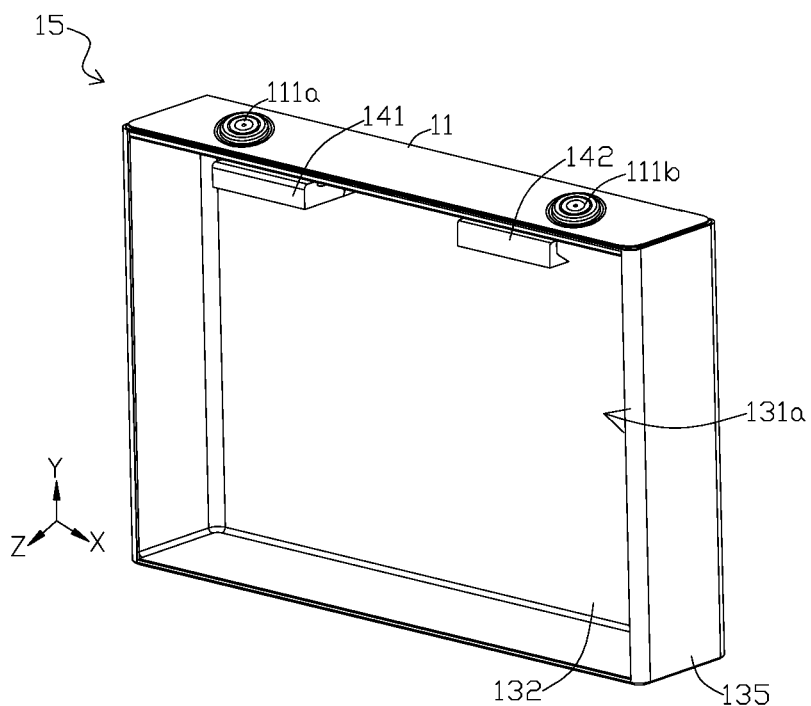
FIG. 10 is a schematic structural diagram of a failed battery cell with an opening provided according to a second specific embodiment of this application.
Figure 11:
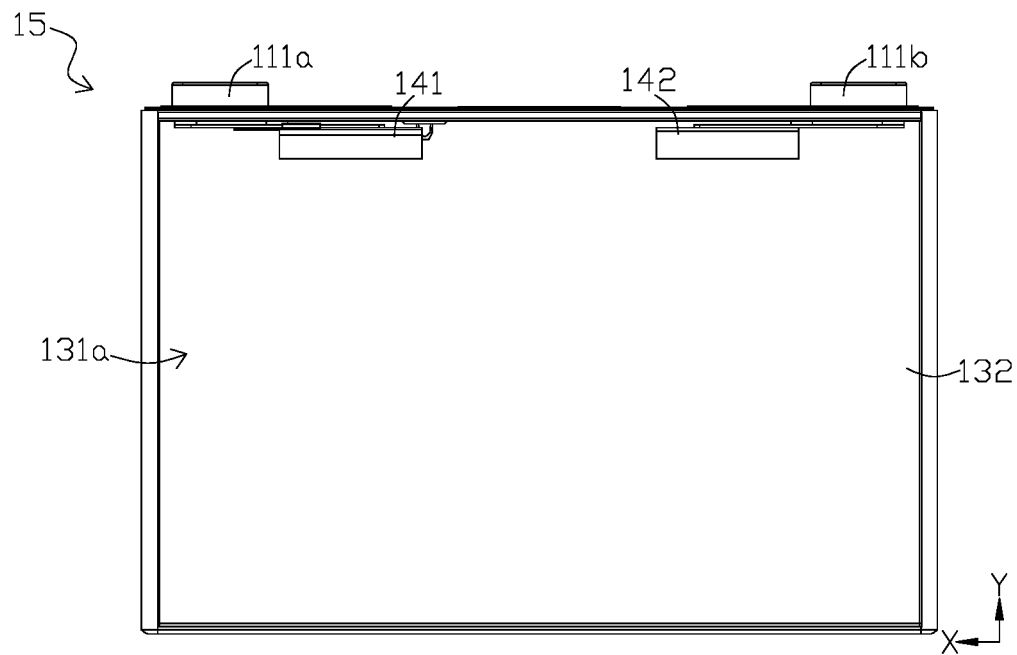
FIG. 11 is a front view of FIG. 10.
Figure 12:
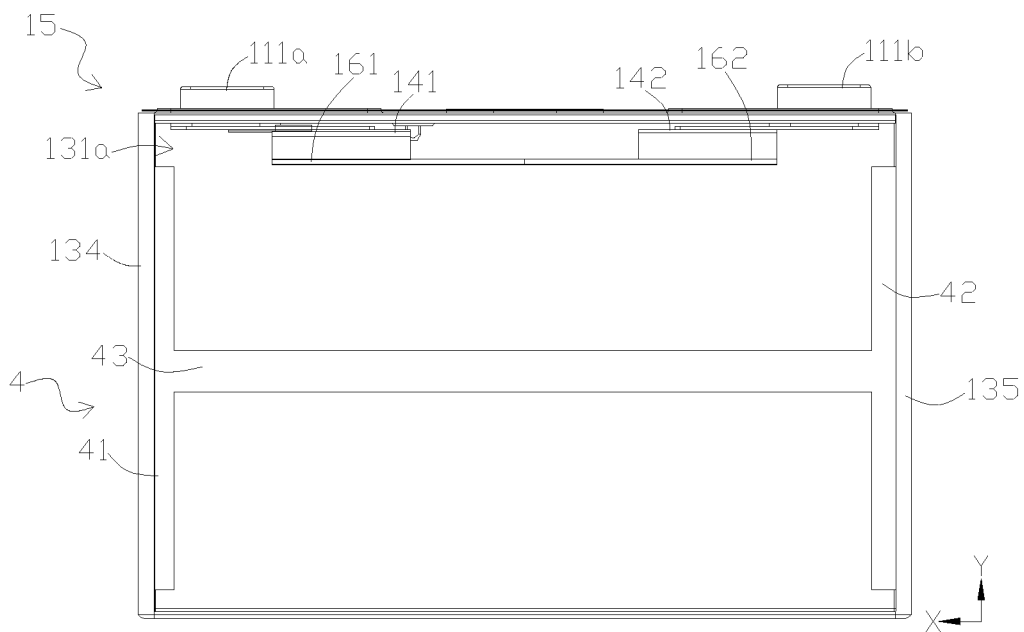
FIG. 12 is a schematic structural diagram of the failed battery cell shown in FIG. 10, with a conductive component and a supporting component provided.

In another specific embodiment, as shown in FIGS. 10 to 12, after the housing 13 of the failed battery cell 15 is provided with the opening 131a, the electrolyte inside the first accommodation cavity 133 can be extracted through the opening 131a. Moreover, the electrode assembly 12 in the first accommodation cavity 133 can be removed through the opening 131a. In this case, the failed battery cell 15 cannot generate electric energy in absence of the electrolyte and the electrode assembly 12, thereby avoiding a risk of burning and explosion when the failed battery cell 15 continues to generate electric energy, and improving safety of the battery module M. In addition, the failed battery cell 15 does not include the electrolyte and the electrode assembly 12, which can reduce the weight of the battery module M and increase the energy density.

It should be noted that, in this embodiment, the shape and size of the opening 131a need to satisfy the following requirement: The electrode assembly 12 can be removed out of the accommodation cavity 133 through the opening 131*a*. To achieve this purpose, the opening 131*a* may be configured as having an outer contour larger than the maximum contour of the electrode assembly 12, so that the electrode assembly 12 can be easily removed. Certainly, during removing, the electrode assembly 12 may alternatively be tilted first, and then removed from the opening 131*a*. In this case, the size of the opening 131*a* can be reduced.

In the embodiments shown in FIGS. 10 to 12, along the height direction Z, the housing 13 of the failed battery cell 15 only includes the second cover plate 132 and does not include the first cover plate 131. In this case, the area of the opening 131*a* is equal to the area of the first cover plate 131, and the area of the electrode assembly 12 is definitely smaller than the area of the first cover plate 131, which ensures that the electrode assembly 12 can be removed through the opening 131*a*. Moreover, the size of the opening 131*a* in this embodiment is relatively large, and larger than the size of the conductive component 16. Therefore, as long as the electrode assembly 12 can be removed through the opening 131*a*, the conductive component 16 can also enter the first accommodation cavity 133 through the opening 131*a*.

In addition, the tabs 122 of the electrode assembly 12 and the electrode terminals 111 are connected by using the adapting pieces 14. Therefore, before the electrode assembly 12 is removed, the tabs 122 need to be disconnected from the adapting pieces 14, and in this case, the conductive component 16 may be connected to the adapting pieces 14 and/or the electrode terminals 111. Alternatively, the adapting pieces 14 are disconnected from the electrode terminals 111, and in this case, the conductive component 16 may be connected to the electrode terminals 111.

Specifically, as shown in FIG. 11 and FIG. 12, the conductive component 16 includes a first conductive part 161 and a second conductive part 162, where the first conductive part 161 is connected to the second conductive part 162, the first conductive part 161 and the positive electrode adapting piece 141 are structures of a same material, so that the two can be connected by welding, and the second conductive part 162 and the negative electrode adapting piece 142 are structures of a same material, so that the two can be connected by welding.

In the embodiments, both the first conductive part 161 and the second conductive part 162 may be made of metal, and materials of the two may be different (the first adapting piece 141 and the second adapting piece 142 are made of different materials) or the same (the first adapting piece 141 and the second adapting piece 142 are made of same materials).

In another embodiment, the first conductive part 161 of the conductive component 16 may be connected to the positive electrode adapting piece 141 by a conductive adhesive. Correspondingly, the second conductive part 162 may be connected to the negative electrode adapting piece 142 by a conductive adhesive. In this case, it is not necessary to connect the components by welding. Therefore, the first conductive part 161 and the second conductive part 162 are not required to be structures of different materials, as long as the first conductive part 161 and the second conductive part 162 are conductive. This can simplify the structure of the conductive component 16 and reduce costs.

In a possible design, as shown in FIG. 11 and FIG. 12, the failed battery cell 15 may further include a supporting component 4. The supporting component 4 is able to pass through the opening 131*a* and reside inside the first accommodation cavity 133. Along the length direction X, the supporting component 4 abuts against the inner wall of the housing 13 to provide support for the housing 13 along the length direction X.

In the embodiments, after the opening 131*a* is provided in the housing 13 of the failed battery cell 15, and the electrode assembly 12 is removed through the opening 131*a*, the housing 13 with a cavity structure has low strength and rigidity. In addition, because the failed battery cell 15 is stacked with the remaining battery cells 1 along the length direction X, the failed battery cell 15 may be deformed and damaged. To increase structural strength of the failed battery cell 15, the supporting component 4 is disposed inside the first accommodation cavity 133 of the housing 13 to increase the structural strength of the failed battery cell 15 along the length direction X.

Specifically, as shown in FIG. 11 and FIG. 12, the supporting component 4 may specifically include a first supporting part 41, a second supporting part 42, and a connecting part 43, where the first supporting part 41 and the second supporting part 42 are arranged along the length direction X, and the two are connected by using the connecting part 43. The first supporting part 41 and the second supporting part 42 may be supporting plates, the first supporting part 41 abuts against the third cover plate 134 of the housing 13, and the second supporting part 42 abuts against the fourth cover plate 135 of the housing 13. The connecting part 43 extends along the length direction X, so that the cross section of the supporting component 4 is an I-shape.

Moreover, the second cover plate 132 of the housing 13 is arranged along the height direction Z, and therefore, when the supporting component 4 is placed into the housing 13, the supporting component 4 may also abut against the second cover plate 132, that is, the supporting component 4 may also abut against an inner wall of the housing 13 along the height direction Z.

In addition, to further increase connection reliability between the supporting component 4 and the housing 13, the two may be attached by a structural adhesive. Specifically, the first supporting part 41 and the third cover plate 134 may be connected by a structural adhesive, and the second supporting part 42 and the fourth cover plate 135 may be connected by a structural adhesive.

In a specific embodiment, in the battery module M, as shown in FIG. 3, a plurality of battery cells 1 are arranged along the length direction X to form a battery cell arrangement structure A. In the embodiment shown in FIG. 3, along the height direction Z, the battery module M includes a layer of the battery cell arrangement structure A. In this case, when any battery cell 1 of the battery module M fails, handling may be performed through the structure described in any of the above embodiments.

In another specific embodiment, along the height direction Z, the battery module M may include at least two layers of battery cell arrangement structures A. When the failed battery cell 15 is located in the uppermost battery cell arrangement structure A, handling may also be performed through the structure described in any of the above embodiments.

When the failed battery cell 15 is not located in the uppermost battery cell arrangement structure A, one or more battery cells 1 are present over the failed battery cell 15. A battery cell 1 over the failed battery cell 15 is defined as a target battery cell, and therefore, the battery module M includes one or more target battery cells. In the target battery cell, the openings 131*a* are provided in both the first cover plate 131 and the second cover plate 132 of the housing 13. Therefore, an electrolyte and the electrode assembly 12 of the target battery cell can be removed through the opening 131a, so that the target battery cell cannot generate electric energy. Moreover, the positive electrode terminal 111a and the negative electrode terminal 111b of the target battery cell are connected by using the conductive component 16, or the positive electrode adapting piece 141 and the negative electrode adapting piece 142 of the target battery cell are connected by using the conductive component 16, so that the target battery cell can serve as a conductor.

After the electrolytes and the electrode assemblies 12 of all target battery cells are removed, the first cover plate 131 of the failed battery cell 15 can be exposed, so that operations can be performed on the failed battery cell 15. In the failed battery cell 15, the second cover plate 132 is located under the first cover plate 131. The first cover plate 131 is provided with an opening 131a. The electrolyte of the failed battery cell 15 is extracted through the opening 131a, the electrode assembly 12 is removed through the opening 131, and the positive electrode terminal 111a and the negative electrode terminal 111b of the failed battery cell 15 are connected by using the conductive component 16. The conductive component 16 may be directly connected to the positive electrode terminal 111a and the negative electrode terminal 111b of the failed battery cell 15, or may be connected to the positive electrode adapting piece 141 and the negative electrode adapting piece 142 of the failed battery cell 15, so as to indirectly connect the positive electrode terminal 111a and the negative electrode terminal 111b.

Therefore, for the battery module M including a plurality of layers of battery cell arrangement structures A, when the failed battery cell 15 is located in an intermediate layer, none of the battery cell(s) 1 over the failed battery cell 15 can generate electric energy or work normally, while the battery cell(s) 1 under the failed battery cell 15 can generate electric energy or work normally.

In addition, an embodiment of this application further provides a failure handling method for a failed battery cell 15. The failure handling method specifically includes the following steps.

S1: Provide an opening 131a in a housing 13.

In this embodiment, the housing 13 includes a first cover plate 131 and a second cover plate 132 along a height direction Z, and the opening 131a is provided in the first cover plate 131 and/or the second cover plate 132, which means the opening 131a is located in a surface of the housing 13 with a largest area, not between the housing 13 and a top cover 11.

S3: Place a conductive component 16 into a first accommodation cavity 133 of the housing 13 through the opening 131a, and connect a positive electrode terminal 111a and a negative electrode terminal 111b by using the conductive component 16. The shape and size of the opening 131a need to be enough for placing the conductive component 16 into the first accommodation cavity 133.

In this embodiment, with the foregoing steps, the positive electrode terminal 111a and the negative electrode terminal 111b of the failed battery cell 15 can be connected inside the housing 13, so that when being connected to the electrode terminals 111, the conductive component 16 does not occupy space outside the failed battery cell 15, thereby preventing the conductive component 16 from connecting to another conductive component of the battery module M, and improving safety and reliability of the battery module M.

Specifically, before step S3, the failure handling method further includes the following step:

S21: Extract an electrolyte from the first accommodation cavity 133 through the opening 131a.

In this embodiment, after the opening 131a is provided, the electrolyte in the first accommodation cavity 133 is extracted, so that the failed battery cell 15 includes no electrolyte, thereby preventing leakage of the electrolyte from affecting safety of the battery module M. Moreover, after the electrolyte is extracted, a positive tab 121a and a negative tab 121b in an electrode unit 121 of the failed battery cell 15 cannot be connected through the electrolyte, and no electric energy can be generated. This reduces a risk of burning and explosion when the failed battery cell 15 continues to work, and improves safety of the battery module M.

Specifically, the step S3 may be specifically as follows:

S31: Connect one end of the conductive component 16 to the positive tab 122a and/or a positive electrode adapting piece 141, and connect the other end of the conductive component 16 to the negative tab 122b and/or a negative electrode adapting piece 142.

In the failed battery cell 15, the electrode terminals 111 and the tabs 122 are connected by adapting pieces 14, and the tabs 122 and the adapting pieces 14 are all located inside the first accommodation cavity 133. Therefore, when the conductive component 16 is connected to the positive electrode terminal 111a and the negative electrode terminal 111b inside the first accommodation cavity 133, it is easier to indirectly connect the conductive component 16 to the tabs 122 and/or the adapting pieces 14.

The conductive component 16 may be connected to the tabs 122 and/or the adapting pieces 14 by welding or by a conductive adhesive.

In some embodiments, after the step S3, the failure handling method may further include the following step:

S4: Inject a structural adhesive into the first accommodation cavity 133 through the opening 131a.

After the step S2, the electrolyte of the failed battery cell 15 is extracted, and the electrode assembly 121 of the failed battery cell 15 is no longer infiltrated in the electrolyte. In this case, the positive electrode plate 121a and the negative electrode plate 121b may be air-dried and fall off, and there is a risk that the fallen electrode plate leaving the first accommodation cavity 133 through the opening 131a may come into contact with the battery cell 1 and the adapting piece 2 of the battery module M, resulting in a short circuit. Therefore, with step S4, the structural adhesive may be injected into the first accommodation cavity 133, which not only strengthens the locations for connecting (directly or indirectly connecting) the conductive component 16 to the electrode terminals 111, but also blocks the opening 131a by the structural adhesive, to prevent the air-dried and fallen electrode plate from leaving the first accommodation cavity through the opening 131a, improving safety of the battery module M.

In another specific embodiment, before the step S3, the failure handling method may further include the following step:

S22: Extract an electrolyte from the first accommodation cavity 133 through the opening 131a, and remove out an electrode assembly 12 of the failed battery cell 15 through the opening 131a.

In this embodiment, after the electrolyte of the failed battery cell 15 is extracted, the failed battery cell 15 cannot generate electric energy, that is, the electrode assembly 12 no longer works. Therefore, after the electrode assembly 12 is removed, not only the space for connecting the conductive component 16 to the electrode terminals 111 inside the first accommodation cavity 133 can be increased, but also an electrode plate of an electrode unit 121 can be prevented from being air-dried and falling off due to extraction of the electrolyte, thereby improving safety of the battery module M.

The shape and size of the opening 131*a* need to be enough for removing out the electrode assembly 12, that is, the opening 131*a* should not be too small. In a specific embodiment, as shown in FIG. 11 and FIG. 12, along the height direction Z, the housing 13 includes the second cover plate 132, but does not include the first cover plate 131 (the first cover plate 131 of the housing 13 is removed). In this case, the size of the opening 131*a* is the same as the size of the first cover plate 131, so that the electrode assembly 12 can be easily removed.

In addition, the tabs 122 of the electrode assembly 12 are connected to the electrode adapting pieces 14, therefore, before the electrode assembly 12 is removed through the opening 131*a*, the tabs 122 needs to be disconnected from the adapting pieces 14 first. Alternatively, the adapting pieces 14 may be disconnected from the electrode terminals 111. In this case, the adapting pieces 14 may be removed together with the electrode assembly 12.

Specifically, in this embodiment, the step S3 may include the following step:

S32: Connect the conductive component 16 to the positive electrode adapting piece 141, and connect the conductive component 16 to the negative electrode adapting piece 142.

In this embodiment, after the electrode assembly 12 is removed out of the first accommodation cavity 133, the tabs 122 are removed together with the electrode assembly 12, so that the conductive component 16 can be connected to the adapting pieces 14 when being indirectly connected to the electrode terminals 111. Moreover, a contact area between an adapting piece 14 and the conductive component 16 meets a current flowing requirement of the battery module M.

In some embodiments, after the step S22, the failure handling method may further include the following step:

S23: Place a supporting component 4 into the first accommodation cavity 133 through the opening 131*a* to make the supporting component 4 abut against an inner wall of the housing 13 along the length direction X.

In the embodiments, after the electrode assembly 12 of the failed battery cell 15 is removed, the housing 13 has low strength and rigidity along the length direction X. When the battery module M vibrates, the failed battery cell 15 may be deformed and damaged. In this step, the supporting component 4 is placed into the first accommodation cavity 133, which can improve the strength and rigidity of the housing 13 along the length direction X, thereby reducing a risk of deformation and damage to the failed battery module M.

It should be noted that in the embodiments, there is no strict sequence between step S23 and step S32. Step S23 may be before step S32, that is, after the electrode assembly 12 of the failed battery cell 15 is removed, the supporting component 4 may be placed into the first accommodation cavity 133, and then the electrode terminals 111 of the failed battery cell 15 are connected (directly or indirectly connected) by using the conductive component 16. Step S23 may alternatively be after step S32, that is, after the electrode assembly 12 of the failed battery cell 15 is removed, the electrode terminals 111 of the battery cell 15 may be connected (directly or indirectly connected) by using the conductive component 16, and then the supporting component 4 is placed into the first accommodation cavity 133. Alternatively, steps S23 and S32 may be performed at the same time.

Although this application has been described with reference to preferred embodiments, any improvements thereto and substitutions of the components thereof with equivalents can be made without departing from the scope of this application. Especially, as long as there is no structural conflict, any of the technical features described in any of the embodiments may be combined with one another in any manner. This disclosure is not limited to any specific embodiment disclosed herein, and includes all technical solutions falling within the scope of the claims.

What is claimed is:

1. A battery module, wherein the battery module comprises:

battery cells, wherein the battery cell comprises a housing, a top cover, and an electrode assembly, the housing is connected to the top cover, the housing comprises a first accommodation cavity, the electrode assembly is located inside the first accommodation cavity, the top cover is provided with a positive electrode terminal and a negative electrode terminal, the positive electrode terminal and the negative electrode terminal are arranged along a length direction of the battery module, and face toward a width direction of the battery module, and the battery cells further comprise a failed battery cell; and a conductive component, wherein the conductive component is connected to the positive electrode terminal and the negative electrode terminal of the failed battery cell;

wherein along a height direction of the battery module, the housing comprises a first cover plate and a second cover plate that are arranged opposite each other, and both the first cover plate and the second cover plate are connected to the top cover, and in the failed battery cell, the first cover plate and/or the second cover plate is provided with an opening, the opening is toward the height direction, the conductive component enters the first accommodation cavity through the opening and resides inside the first accommodation cavity, and the failed battery cell comprises no electrolyte; and wherein the length direction and the width direction are both parallel to the first cover plate and the second cover plate, and the height direction is perpendicular to the first cover plate and the second cover plate.

2. The battery module according to claim 1, wherein the electrode assembly comprises tabs which comprise a positive tab and a negative tab, and the battery cell comprises adapting pieces which comprise a positive electrode adapting piece and a negative electrode adapting piece;

the positive electrode adapting piece is connected to the positive tab and the positive electrode terminal, and the negative electrode adapting piece is connected to the negative tab and the negative electrode terminal; and in the failed battery cell, one end of the conductive component is connected to the positive tab and/or the positive electrode adapting piece, and the other end is connected to the negative tab and/or the negative electrode adapting piece.

3. The battery module according to claim 2, wherein the conductive component comprises a first conductive part and a second conductive part, and the first conductive part is connected to the second conductive part;

the first conductive part is connected to the positive tab, and the second conductive part is connected to the negative tab; and the first conductive part and the positive tab are structures of a same material, and the second conductive part and the negative tab are structures of a same material.

4. The battery module according to claim 2, wherein along the height direction, the second cover plate is located under the first cover plate, and the opening is provided in the first cover plate; and the opening extends along the length direction, and along the height direction, at least part of the tabs and/or the adapting pieces is exposed through the opening.

5. The battery module according to claim 1, wherein the first accommodation cavity is filled with a structural adhesive.

6. The battery module according to claim 1, wherein the electrode assembly of the failed battery cell is removed through the opening.

7. The battery module according to claim 1, wherein the battery cell further comprises a positive electrode adapting piece and a negative electrode adapting piece;

the positive electrode adapting piece is connected to the positive electrode terminal, the negative electrode adapting piece is connected to the negative electrode terminal, and in the failed battery cell, the conductive component is connected to the positive electrode adapting piece and the negative electrode adapting piece;

the conductive component comprises a first conductive part and a second conductive part, wherein the first conductive part is connected to the second conductive part, the first conductive part is connected to the positive electrode adapting piece, and the second conductive part is connected to the negative electrode adapting piece; and the first conductive part and the positive electrode adapting piece are structures of a same material, and the second conductive part and the negative electrode adapting piece are structures of a same material.

8. The battery module according to claim 1, wherein the failed battery cell further comprises a supporting component, and the supporting component is located inside the first accommodation cavity; and along the length direction, the supporting component abuts against an inner wall of the housing.

9. The battery module according to claim 2, wherein a plurality of the battery cells are arranged along the length direction to form a battery cell arrangement structure, and along the height direction, the battery module comprises at least two layers of the battery cell arrangement structures;

along the height direction, a battery cell located over the failed battery cell is a target battery cell, and the battery module comprises one or more target battery cells;

in the target battery cell, the openings are provided in both the first cover plate and the second cover plate, the electrode assembly of the target battery cell is removed through the opening of the first cover plate, and the positive electrode terminal and the negative electrode terminal of the target battery cell are connected by using the conductive component, or the positive electrode adapting piece and the negative electrode adapting piece of the target battery cell are connected by using the conductive component; and in the failed battery cell, the second cover plate is located under the first cover plate, the opening is provided in the first cover plate, the electrode assembly of the failed battery cell is removed through the opening, and the positive electrode terminal and the negative electrode terminal of the failed battery cell are connected by using the conductive component, or the positive electrode adapting piece and the negative electrode adapting piece of the failed battery cell are connected by using the conductive component.

10. A device, using a battery cell as a power supply, wherein the device comprises:

a traction power source, the traction power source being configured to provide driving force for the device; and the battery module configured to supply electric energy to the traction power source, wherein the battery module comprises:

battery cells, wherein the battery cell comprises a housing, a top cover, and an electrode assembly, the housing is connected to the top cover, the housing comprises a first accommodation cavity, the electrode assembly is located inside the first accommodation cavity, the top cover is provided with a positive electrode terminal and a negative electrode terminal, the positive electrode terminal and the negative electrode terminal are arranged along a length direction of the battery module, and face toward a width direction of the battery module, and the battery cells further comprise a failed battery cell; and a conductive component, wherein the conductive component is connected to the positive electrode terminal and the negative electrode terminal of the failed battery cell;

wherein along a height direction of the battery module, the housing comprises a first cover plate and a second cover plate that are arranged opposite each other, and both the first cover plate and the second cover plate are connected to the top cover, and in the failed battery cell the first cover plate and/or the second cover plate is provided with an opening, the opening is toward the height direction, the conductive component enters the first accommodation cavity through the opening and resides inside the first accommodation cavity, and the failed battery cell comprises no electrolyte; and wherein the length direction and the width direction are both parallel to the first cover plate and the second cover plate, and the height direction is perpendicular to the first cover plate and the second cover plate.

11. The device according to claim 10, wherein the electrode assembly comprises tabs which comprise a positive tab and a negative tab, and the battery cell comprises adapting pieces which comprise a positive electrode adapting piece and a negative electrode adapting piece;

the positive electrode adapting piece is connected to the positive tab and the positive electrode terminal, and the negative electrode adapting piece is connected to the negative tab and the negative electrode terminal; and in the failed battery cell, one end of the conductive component is connected to the positive tab and/or the positive electrode adapting piece, and the other end is connected to the negative tab and/or the negative electrode adapting piece.

12. The device according to claim 11, wherein the conductive component comprises a first conductive part and a second conductive part, and the first conductive part is connected to the second conductive part;

the first conductive part is connected to the positive tab, and the second conductive part is connected to the negative tab; and the first conductive part and the positive tab are structures of a same material, and the second conductive part and the negative tab are structures of a same material.

13. The device according to claim 10, wherein the failed battery cell further comprises a positive electrode adapting piece and a negative electrode adapting piece;

the positive electrode adapting piece is connected to the positive electrode terminal, the negative electrode adapting piece is connected to the negative electrode terminal, and in the failed battery cell, the conductive component is connected to the positive electrode adapting piece and the negative electrode adapting piece;

the conductive component comprises a first conductive part and a second conductive part, wherein the first conductive part is connected to the second conductive part, the first conductive part is connected to the positive electrode adapting piece, and the second conductive part is connected to the negative electrode adapting piece; and the first conductive part and the positive electrode adapting piece are structures of a same material, and the second conductive part and the negative electrode adapting piece are structures of a same material.

14. A failure handling method for the battery module of claim 1, wherein the failure handling method comprises:

providing an opening in the first cover plate and/or the second cover plate of the failed battery cell;

extracting an electrolyte from the first accommodation cavity of the failed battery cell through the opening; and placing a conductive component into the first accommodation cavity through the opening, and connecting the positive electrode terminal and the negative electrode terminal of the failed battery cell by using the conductive component.

15. The failure handling method according to claim 14, wherein the failed battery cell comprises a positive electrode adapting piece, a negative electrode adapting piece, and an electrode assembly, the electrode assembly comprises a positive tab and a negative tab, the positive electrode adapting piece is connected to the positive tab and the positive electrode terminal, and the negative electrode adapting piece is connected to the negative tab and the negative electrode terminal; and when the positive electrode terminal and the negative electrode terminal are to be connected by using the conductive component, the failure handling method comprises:

connecting one end of the conductive component to the positive tab and/or the positive electrode adapting piece, and connecting the other end of the conductive component to the negative tab and/or the negative electrode adapting piece.

16. The failure handling method according to claim 14, wherein after the positive electrode terminal and the negative electrode terminal are connected by using the conductive component, the failure handling method further comprises:

injecting a structural adhesive into the first accommodation cavity through the opening.

17. The failure handling method according to claim 14, wherein before the placing a conductive component into the first accommodation cavity through the opening, and connecting the positive electrode terminal and the negative electrode terminal by using the conductive component, the failure handling method further comprises:

extracting an electrolyte from the first accommodation cavity through the opening, and removing out an electrode assembly of the failed battery cell through the opening.

18. The failure handling method according to claim 17, wherein the failed battery cell comprises a positive electrode adapting piece and a negative electrode adapting piece, the positive electrode adapting piece is connected to the positive electrode terminal, and the negative electrode adapting piece is connected to the negative electrode terminal; and when the positive electrode terminal and the negative electrode terminal are to be connected by using the conductive component, the failure handling method comprises:

connecting the conductive component to the positive electrode adapting piece, and connecting the conductive component to the negative electrode adapting piece.

* * * * *